United States Patent [19]

Slavens

[11] 4,195,763
[45] Apr. 1, 1980

[54] APPARATUS FOR LOCATING WELDING CARRIAGE TRACK

[75] Inventor: Clyde M. Slavens, Houston, Tex.

[73] Assignee: Midcon Pipeline Equipment Co., Houston, Tex.

[21] Appl. No.: 910,355

[22] Filed: May 30, 1978

[51] Int. Cl.² .............................................. B23K 1/00
[52] U.S. Cl. .......................................... 228/29; 269/1
[58] Field of Search ......................... 29/464, 466, 468; 228/29, 45; 269/228, 1

[56] References Cited

U.S. PATENT DOCUMENTS 3,380,148   4/1968   Nelson et al. ........................... 29/464

*Primary Examiner*—Robert C. Watson
*Attorney, Agent, or Firm*—Carl B. Fox, Jr.

[57] ABSTRACT

Apparatus for locating a welding carriage track disposed about a pipe adjacent an end of the pipe, wherein a linkage actuated clamp is adapted to engage opposite edges of the track, and wherein a surface of the apparatus is adapted to engage the end of the pipe about which the apparatus is disposed at a fixed distance from the near edge of the track, whereby said surface may be firmly engaged against the end of the pipe to dispose the track at said fixed distance from the end of the pipe. The distance between the pipe end engagement surface and the near edge of the track is fixed, but the apparatus is adapted to be used with tracks of different widths.

11 Claims, 5 Drawing Figures

U.S. Patent
Apr. 1, 1980
4,195,763
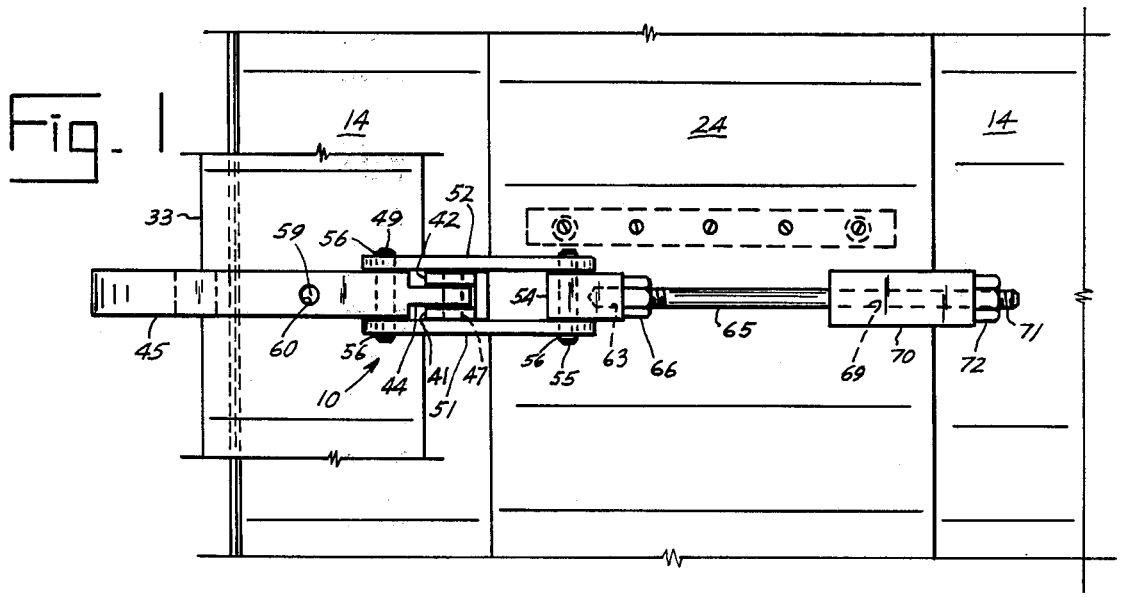
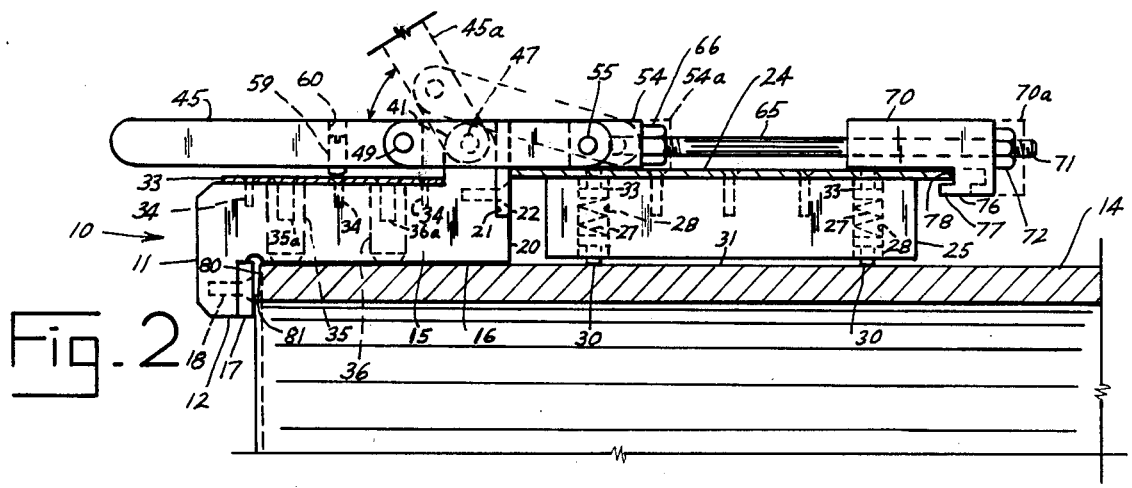
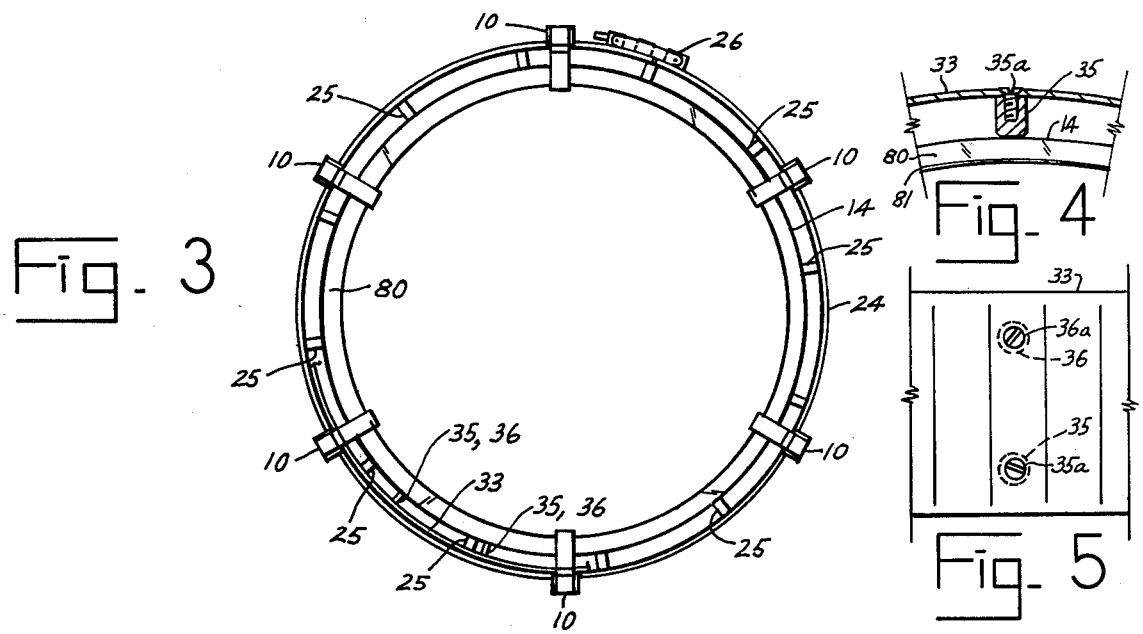

APPARATUS FOR LOCATING WELDING CARRIAGE TRACK

BACKGROUND OF THE INVENTION

In the welding of pipes together end-to-end through use of welding apparatus which is carried about one of the pipes by a support apparatus which travels along a track affixed about the pipe, it is extremely important that the track be uniformly fixed at a prescribed distance from the end of the pipe. If the distance between the track and the end of the pipe varies about the periphery of the pipe, then the welding apparatus will not follow the end-to-end pipe abutment accurately and inferior welds will result. While it might appear an easy task to affix the track at a uniform distance from the end of the pipe completely around the length of the track, in practice this is not true. One problem is that considerable time is required to be spent in adjusting the track position before it can be accurately spaced with relation to the pipe end completely therearound. In positioning the track accurately, it is necessary from the practical standpoint that an apparatus be provided which may be quickly engaged with the track to hold the track in fixed position with relation to the apparatus, and which may be quickly and accurately positioned in proper position on the pipe end, in order that excessive time will not be spent in installation of the track so that delays in the progress of the pipe welding operations will not occur. This invention seeks to solve the aforementioned problems.

SUMMARY OF THE INVENTION

The invention provides apparatus for accurately positioning a continuous track disposed to encircle a pipe, including a clamping device to firmly engage opposite sides of the track, and a spacing surface for positioning against the end of the pipe whereby the track is accurately positioned a given distance from the end of the pipe. The clamp which engages the track is provided in the form of a linkage operated mechanism which can be quickly engaged with the track, and the apparatus may be easily and quickly positioned on the pipe end. After the track has been fixed in place in its proper position, the apparatus according to the invention is removed before welding is commenced, and may be moved to another location to be used in positioning another track.

A principal object of the invention is to provide apparatus for accurately positioning circular track disposed around a pipe at a uniform distance from the end of the pipe. Another object of the invention is to provide such apparatus which positions the track accurately, and which may be quickly engaged with the track and quickly disengaged therefrom. A further object of the invention is to provide such an apparatus which may be employed with tracks of different widths. A still further object of the invention is to provide such an apparatus which is economical, dependable, and easily operated.

Other objects and advantages of the invention will appear from the following detailed description of a preferred embodiment thereof, reference being made to the accompanying drawings.

BRIEF DESCRIPTIONS OF THE DRAWINGS

FIG. 1 is a top elevation of an apparatus element of preferred form according to the invention.

FIG. 2 is a side elevation of the apparatus element shown in FIG. 1.

FIG. 3 is a schematic end elevation showing the manner of assembly and use of the apparatus.

FIGS. 4 and 5 are, respectively, partial end and plan views showing the connection band portion of the apparatus, FIG. 4 being partially in vertical cross section.

DESCRIPTION OF THE PREFERRED EMBODIMENTS

Referring now to the drawings in detail, the apparatus 10 includes a support member 11 comprising a shaped block of metal or other suitable material having a protruding portion 12 at one end adapted to be engaged against the end of a pipe 14 and having a main body portion 15 having a flat inner surface 16 adapted to engage the outer surface of the pipe 14. The complete apparatus will include a plurality of interconnected apparatuses 10, as will later be explained.

Body portion 12 has a hardened plate 17 affixed thereagainst by one or more screws 18. The hardened plate 17 is provided in order that the inward side of body portion 12 may be engaged, even under impact, with the pipe end without marring or other disfigurement of its surface. The inner end 20 of body portion 13 has a recess 21 into which is fixed a hardened plate 22 adapted to engage the edge of a track 24. The track 24 is in the form of a curved strip of metal of uniform width, which is supported by a plurality of cross bars 25 circularly spaced therearound, the track ends being adjustably attached one to the other by a device 26 which releasably latches the track ends together. Track 24, as shown, includes compression springs 27 disposed in cylindrical openings 28 of the bars 25 to bias pins 30 against the outer pipe surface 31. The compressive forces of the springs are adjustable by rotation of screws 33 at the outer ends of opening 28. The described structure provides that the track will have a certain degree of resiliency around its length, to absorb the effects of expansion and contraction of the pipe caused by temperature differences, and to facilitate bringing the pipe ends together for connection. While this form of track is preferred, the subject invention may be used with other similar tracks having different structures.

A band or strip 33, preferably formed of metal, is affixed by screws 34 to the outer sides of members 11. Elements 35, 36, called "stand-offs", are affixed in circularly spaced pairs to the inner side of band 33 by screws 35a, 36a, to maintain the band 33 spaced from the outer pipe surface. Band 33 serves to combine a plurality of apparatuses into a unitary apparatus, and to space the apparatuses 10 about the pipe. Any suitable number of apparatuses 10 may be assembled in this manner, to adequately space the track from the pipe end around the periphery of the pipe.

Member 11 has at its upper surface a pair of upstanding plate portions 41, 42 forming a yoke within which tongue 44 of handle 45 is disposed. Tongue 44 is pivotally fixed between yoke elements 41, 42 by a cross pin 47. A cross pin 49 engaged through handle 45 is pivotally engaged with a pair of links 51, 52, the opposite ends of which are pinned to a block 54 by a cross pin 55. The opposite ends of the cross pins 49, 55 are secured by split rings 56 engaged against the outer sides of the links 51, 52. Cross pin 47 is press fitted through openings through yoke elements 41, 52, to be fixed in place.

A screw 59 is adjustably disposed in tapped opening 60 of handle 45, the position of handle 45 when in its latched position generally parallel to member 11 being adjustable by adjustment of the position of screw 59.

Block 54 has a tapped opening 63 into one end thereof into which is screwed the threaded end of a rod 65. Lock nut 66 is provided to secure rod 65 in position. The opposite end of rod 65 passes through a cylindrical passage 69 through a movable block 70, the end portion 71 of rod 65 being threaded and having a nut 72 screwed thereonto. Nut 72 limits the right hand movement of block 70, as shown in FIGS. 1 and 2. The effective length of rod 65 may be adjusted by adjusting the position of nut 72 on threads 71.

Block 70 has a projecting portion 76 having an inturned lip 77, one edge of the track 24 being engageable in the recess 78 formed thereby. The lip 77 prevents the block 70 from being accidentally disengaged from the track edge. Pipe 14 has an end bevel 80 having a flange shaped edge 81 which is engaged by plate 17. When the apparatus is used, plate 17 is placed against the end of the pipe and the handle 45 is raised to an angularly elevated position such as position 45a, which moves pin 49 toward the right, FIG. 2, and moves blocks 54 and 70 toward the right, to extended positions 54a, 70a. This movement enables lip 77 to be placed around the edge of track 24 so that track 24 may be disposed between plate 22 and recess 78. Handle 45 is then moved downwardly to its solid line position, FIG. 2, which draws block 70 toward the left to engage the track edge in recess 78, the other track edge being firmly engaged against plate 22. If the width adjustment of the apparatus is incorrect, it may be easily adjusted by rotation of nut 72, so that the track is snugly engaged at its opposite sides. To insure that plate 17 is snugly against the end of the pipe, member 11 may be struck by a hammer or other tool at its lefthand end to drive member 11 longitudinally of pipe 14 until plate 17 is firmly engaged against the end of the pipe.

In FIG. 3, a plurality of the apparatuses 10 are shown disposed circularly spaced about the pipe and about the track 24, assembled together by the spacing band 33. Referring also to FIGS. 4-5, the band 33 has, at spaced intervals therearound, pairs of stand-offs 35, 36 affixed thereto by screws 35a, 36a. The stand-offs maintain band 33 spaced from the outer surface of the pipe, and are spaced apart between the apparatuses 10 for this purpose. The band 33, having the circularly spaced apparatuses 10 connected thereto, is placed as an assembled unit around the pipe end to properly space track 24 from the end of the pipe. A sufficient number of apparatuses 10 are employed so that the track may be accurately positioned completely around its periphery. With each of the apparatuses 10 latched to the track, and with the pad 17 of each apparatus 10 firmly engaged with the end of the track, the latch devices 26 may be operated to secure the track to the pipe in non-movable condition. Then, the band 33 and apparatuses 10 may be removed from the track by movement of the handles 45 to their positions 45a, the blocks 70 being thereby disengaged from the track so that the apparatuses 10 may be easily removed.

The apparatus herein described is very simple in operation and yet affords positive and accurate positioning of the track 24 about the pipe. Since the distance between plates 17 and 22 of each apparatus 10 is the same fixed distance, the distance between the track and the pipe end will be accurately fixed so that the track will be uniformly accurately spaced at the same distance from the pipe end completely therearound. Since the apparatus may be rapidly affixed to or removed from the track and pipe, no lost time will be encountered in use of the apparatus.

While a preferred embodiment of the apparatus has been described and shown in the drawings, many modifications thereof may be made by a person skilled in the art without departing from the spirit of the invention, and it is intended to protect by Letters Patent all forms of the invention falling within the scope of the following claims.

I claim:

1. Apparatus for use in locating a track disposed about a pipe in a position uniformly spaced from the end of the pipe, comprising body means having inwardly facing first surface means adapted to engage the exterior wall of a pipe and having second surface means generally perpendicular to said first surface means and adapted to engage the end of the pipe and having third surface means generally perpendicular to said first surface means and facing in the same direction as said second surface means and adapted to engage a track disposed to surround the pipe at the side of said track toward the end of the pipe, the spacing between said second and third surface means axially of the pipe being a fixed spacing whereby the track is located in a position spaced from the pipe end by said fixed spacing when said second surface means is engaged with the end of the pipe and said third surface means is engaged with the side of the track toward the end of the pipe.

2. Apparatus for use in locating a track disposed about a pipe in a position uniformly spaced from the end of the pipe, comprising body means having inwardly facing first surface means adapted to engage the exterior wall of a pipe and having second surface means generally perpendicular to said first surface means and adapted to engage the end of the pipe and having third surface means generally perpendicular to said first surface means and facing in the same direction as said second surface means and adapted to engage a track disposed to surround the pipe at the side of said track toward the end of the pipe, arm means carried by said body means adapted to extend across the track and having fourth surface means facing said third surface means and adapted to engage the other side of the track to hold the track against said third surface means, the spacing between said second and third surface means axially of the pipe being a fixed spacing whereby the track is located in a position spaced from the pipe end by said fixed spacing when said second surface means is engaged with the end of the pipe and said third surface means is engaged with the side of the track toward the end of the pipe.

3. The combination of claim 2, said arm means being of adjustable length.

4. The combination of claim 3, said arm means being adapted to extend over the outer side of the track.

5. The combination of claim 4, said arm means comprising bar means pivotally connected to said body means at one end of said bar means and being pivotally movable between a position against said body means and angular positions away from said body means, a first member disposed between said body means and said other side of the track, link means extending past said pivotal connection of said bar means to said body means pivotally connecting said first member to said bar means intermediate the length of the bar means, a second member having said fourth surface means, and length adjustable means connecting said first and second members, said first and second members being moved toward said body means when said bar means is moved from a said angular position to said position against said body means and thereby moving said fourth surface means toward said third surface means to clamp said track therebetween.

6. The combination of claim 5, said length adjustable means comprising a shaft fixed to said first member extending through an opening through said second member and having a nut screwed onto its end beyond said second member, rotation of said nut adjusting the spacing of said second member from said first member.

7. The combination of claim 5, including means adjustably extendable between said bar means and said body means for adjusting said position of said bar means against said body means.

8. The combination of claim 5, including means adjustably extendable from said body means toward the pipe for adjusting the position of said first surface means against the pipe.

9. The combination of claim 5, said second and third surface means of said body means being hardened surface means whereby said fixed spacing will not be altered by wear of said second and third surface means.

10. The combination of claim 2, 3, 4, 5, 6, 7, 8, or 9, including a plurality of said apparatuses disposed circularly spaced around the length of a track disposed about the pipe.

11. The combination of claim 2, 3, 4, 5, 6, 7, 8, or 9, including a plurality of said apparatuses disposed circularly spaced around the length of a track disposed about the pipe, said apparatuses being connected by spacer band means connecting said apparatuses together as a unit, and including means for spacing said spacer band means from the outer surface of the pipe.

* * * * *